(12) United States Patent  
Fraenkel

(10) Patent No.: US 8,794,875 B2  
(45) Date of Patent: Aug. 5, 2014

(54) GRAVITY FOUNDATIONS FOR TIDAL STREAM TURBINES

(75) Inventor: Peter L. Fraenkel, London (GB)

(73) Assignee: Marine Current Turbines Limited, Frimley (GB)

( * ) Notice: Subject to any disclaimer, the term of this patent is extended or adjusted under 35 U.S.C. 154(b) by 1105 days.

(21) Appl. No.: 12/160,917

(22) PCT Filed: Jan. 18, 2007

(86) PCT No.: PCT/GB2007/000131  
§ 371 (c)(1), (2), (4) Date: Mar. 26, 2010

(87) PCT Pub. No.: WO2007/083105  
PCT Pub. Date: Jul. 26, 2007

(65) Prior Publication Data  
US 2010/0183377 A1    Jul. 22, 2010

(30) Foreign Application Priority Data  
Jan. 18, 2006  (GB) .................................. 0600942.7

(51) Int. Cl.  
*E02D 29/00* (2006.01)

(52) U.S. Cl.  
USPC ......... 405/195.1; 405/203; 405/205; 405/207

(58) Field of Classification Search  
USPC .............. 405/195.1, 199, 200, 203, 205, 206, 405/207, 209, 229; 60/398; 52/126.1, 52/126.3, 2.18  
See application file for complete search history.

(56) References Cited

U.S. PATENT DOCUMENTS

| | | | | |
|---|---|---|---|---|
| 3,062,014 A * | 11/1962 | Newcomb | ...................... | 405/205 |
| 3,741,320 A * | 6/1973 | Hilfing | ............................... | 175/6 |
| 5,230,215 A | 7/1993 | Nagata | ............................ | 60/502 |
| 5,803,668 A * | 9/1998 | Seki et al. | ..................... | 405/204 |
| 6,652,221 B1 | 11/2003 | Praenkel | ........................ | 415/3.1 |
| 2005/0285407 A1* | 12/2005 | Davis et al. | ..................... | 290/54 |
| 2006/0125242 A1 | 6/2006 | Fraenkel | ........................ | 290/54 |
| 2006/0152011 A1 | 7/2006 | Fraenkel | ........................ | 290/54 |
| 2006/0232075 A1 | 10/2006 | Fraenkel | ........................ | 290/54 |
| 2008/0232965 A1 | 9/2008 | Fraenkel | ........................ | 416/85 |
| 2008/0284176 A1 | 11/2008 | Fraenkel | ........................ | 290/54 |
| 2009/0121487 A1 | 5/2009 | Fraenkel | ........................ | 290/53 |

FOREIGN PATENT DOCUMENTS

| | | | | |
|---|---|---|---|---|
| AU | 200026819 B2 | 9/2000 | ............. | F03B 17/06 |
| EP | 1 083 333 A2 | 3/2001 | ............. | F03B 3/12 |
| GB | 2 256 011 A | 11/1992 | ............. | F03B 13/26 |
| GB | 2 311 566 A | 10/1997 | ............. | F03B 13/22 |
| GB | 2 347 976 A | 9/2000 | ............. | F03B 13/10 |

(Continued)

*Primary Examiner* — Sean Andrish

(57) ABSTRACT

A method for mounting at last one tidal turbine and its associated support structures in a river or sea bed. The turbine and associated support structures are joined to a base of such weight as to involve gravitational forces of such magnitude as to be sufficient to withstand forces acting to tend to displace the turbine and its associated support structures. The base structure can be pre-assembled and transported to a required location of installation by lowering to the sea or river bed. Conveniently, the transportation is by means of an installation vessel incorporating a facility for lowering the entire assembly including at least one turbine, a support column, and the base structure in a controlled manner to rest at a desired position on the river or sea bed.

18 Claims, 8 Drawing Sheets

(56) References Cited

FOREIGN PATENT DOCUMENTS

| GB | 2 348 250 A | 9/2000 | ............. F03B 13/10 |
| GB | 2 348 465 A | 10/2000 | ................ F03D 9/00 |
| JP | 2005069025 | * 3/2005 | |
| KR | 20020071290 | 9/2002 | |
| WO | WO 00/50768 | 8/2000 | ............. F03B 17/06 |
| WO | WO 02/066828 A1 | 8/2002 | ............. F03B 13/12 |
| WO | WO 2004/015207 A1 | 2/2004 | ................ E02D 5/28 |
| WO | WO 2005/061887 A1 | 7/2005 | ............. F03B 17/06 |
| WO | WO 2007/045853 A1 | 4/2007 | ............. F03B 13/26 |

* cited by examiner

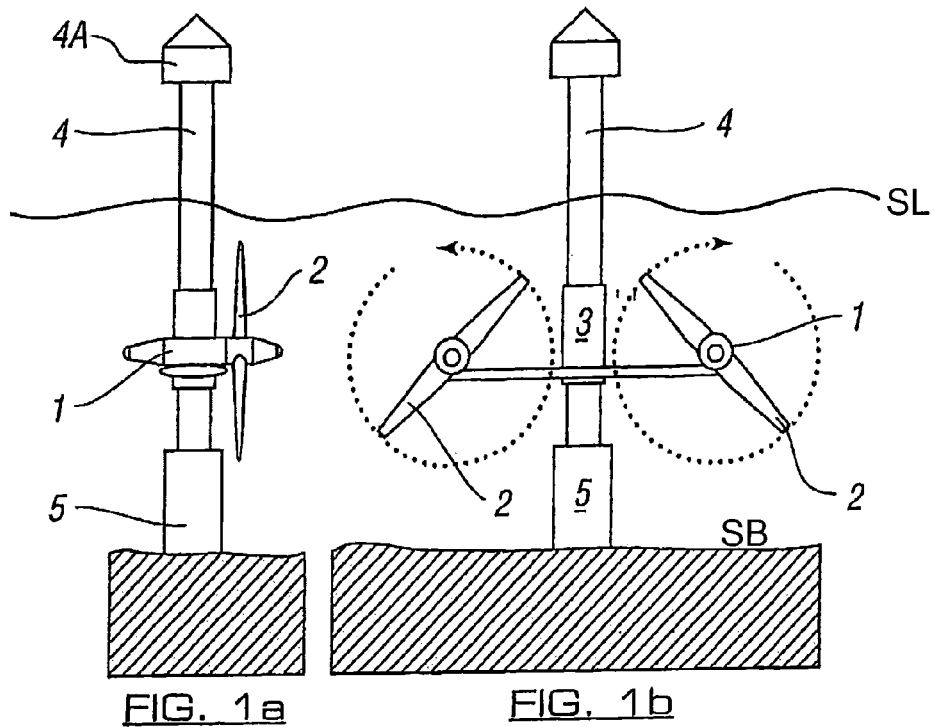
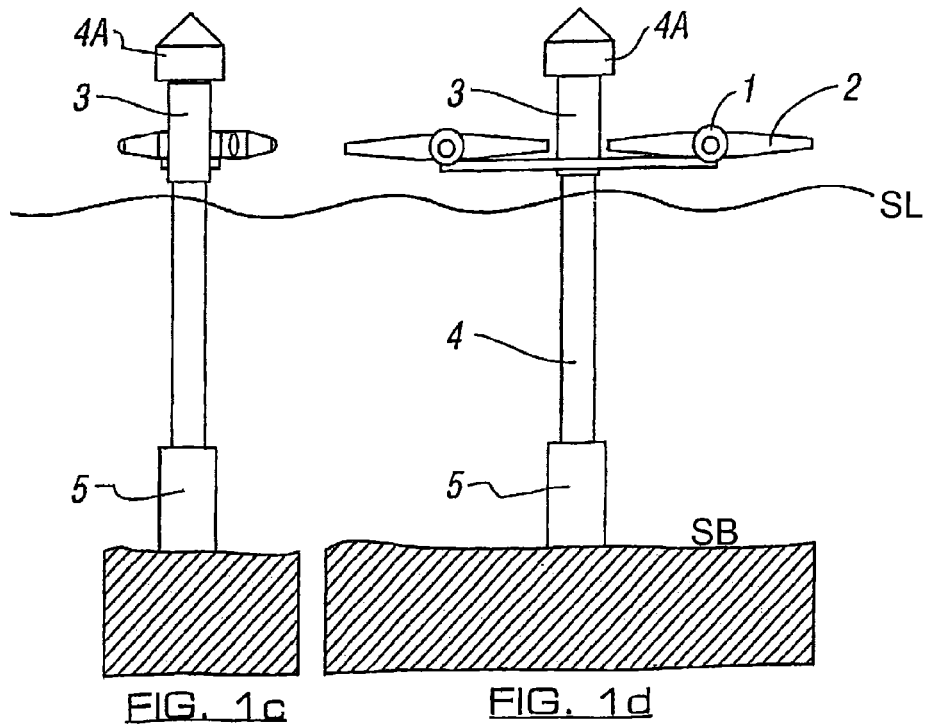

GRAVITY FOUNDATIONS FOR TIDAL STREAM TURBINES

CROSS REFERENCE TO RELATED APPLICATIONS

This US National Stage application claims benefit of International Application No. PCT/GB2007/000131 filed Jan. 18, 2007, the entire content of which is hereby incorporated herein by reference. The International Application claims priority to United Kingdom (UK) application No. 0600942.7 filed Jan. 18, 2006, the entire contents of which is hereby incorporated herein by reference.

BACKGROUND OF THE INVENTION

This invention relates to turbines and any other such devices capable of interacting with a flow of water in such a manner as to transfer energy from the water to a mechanically driven device.

This invention relates more particularly to turbines or other such devices arranged to be driven by the action of a flow of water or other flowing medium. Thus, the present invention relates in particular to the use of turbines and similar moving devices capable of extracting kinetic energy from flowing water for the purposes of utilising such energy to produce either electricity, shaft power or pumping water or other liquids or gases for a required useful purpose.

PRIOR ART

It is known how to use turbines and rotating machinery for the purpose of extracting energy from moving water currents, for example in our British Patents GB 2311566 "Column Mounted Water Current Turbine", GB 2348250 "Pile Mounted Vertically Displaceable Water Turbine", and GB 2347976 "Variable Pitch Water Turbine".

In these patents we have disclosed constructions pertaining to water driveable turbines where one or preferably two or more rotors may be arranged such that they are supported on a structure embedded in, or carried on a foundation set in the sea, river or estuary bed. We have also disclosed similar relevant information in foreign patents derived from the above mentioned British patents, including among others, U.S. Pat. No. 6,652,221, European EP 1183463, New Zealand NZ 514274 and Australian AU 766741, all entitled 'Water Current Turbine Sleeve Mounting".

In relation to such known art it should be noted that said water driveable devices will generally be connected mechanically (or hydraulically or pneumatically) to a power train capable of absorbing the available energy from the relatively slow rotational speed of the device in response to relatively slow moving but forceful water movements, and converting it to a more usable form of energy such as electricity or pressurised fluid which may be readily transferred by way of cables or pipes (respectively) to a point of application to be usefully exploited. Said power train may typically consist of a geared speed-increaser coupled to an electrical generator or to a hydraulic pump or in some cases the rotor may be directly coupled without recourse to a mechanical speed-increaser to a specially designed and matched slow-speed generator or pump.

OBJECTS OF THE INVENTION

It is a primary object of the invention to offset certain disadvantages arising in relation to devices which are mounted on a structure which needs to engage with a river or seabed sufficiently securely to resist the strong reactions resulting from the extraction of kinetic energy from the water flow to ensure that the support structure cannot move under even the most severe loads caused by either the reactions from operating the power system or from extreme storm conditions that will inevitably occur from time to time in most offshore locations.

In previous embodiments of our water current turbine inventions as disclosed in the above mentioned patent specifications the proposed preferred solution to this problem was to provide a tubular mono-pile or a multiplicity of such mono-piles, each set into a socket drilled into the river or seabed using well known procedures. Such an arrangement produces a foundation with predictable characteristics and which can be designed to prevent any risk of movement relative to the seabed even under extreme dynamic loads. However, it has been appreciated on the basis of experience that there is an inherent disadvantage associated with the installation and use of mono-piles, or other forms of piled structures as were also proposed in our previous patents in that the requirement to drill the sockets and introduce the piles into said sockets in a fast moving water column generally requires a jack-up barge to support the drilling equipment and to provide craneage to present/handle the pile. The stability of jack-up barges is constrained in strong currents which can limit the depth of water such a barge can safely function in. Hence to drill sockets and install piles in deeper water demands the use of disproportionately large and costly vessels.

It is thus an object of the present invention to provide improvements in foundations for water current driven turbines which can avoid the need for any significant seabed preparatory work, and in that way permit a wider choice of locations where the water current turbine technology may readily be installed.

STATEMENTS OF THE INVENTION

Broadly according to a first aspect of the invention there is provided an arrangement for mounting at last one tidal turbine and its associated support structures in a river or sea bed, characterised by mounting the turbine and associated support structures upon a base structure of such weight as to involve gravitational forces of such magnitude as to be sufficient to withstand forces acting in such manner as to tend to displace the turbine and its associated support structures.

Preferably the base structure is pre-assembled and incorporates means for mounting the support structures for the tidal turbine or turbines, and in that said foundation structure is of such construction as to be transportable to a to a required location of installation for lowering to the sea or river bed. In accordance with a further aspect of the invention a base structure for operationally mounting a tidal turbine is of such weight as to provide a secure foundation based largely on gravitational forces, and of such form that the structure can potentially be installed without the need for large and costly specialised vessels such as jack-up barges.

A further aspect of the invention is to provide a prefabricated base structure capable of holding water current turbine assemblies securely in fast moving currents and affording the possibility of enabling the base structure be installed without necessarily using jack-up barges or large specialised installation vessels with heavy lift cranes.

A further aspect of the invention is to provide a method of presenting a base structure to a seabed/flowing river bed characterised in that means are provided whereby the base structure may be provided at a required location on a river or seabed flowing river bed in a stable and controlled manner, in that means are also available to ensure it will satisfactorily engage with any uneven natural surfaces of the river/seabed bed, and that means are also provided to ensure that currents will not cause scour that may undermine any such foundation resting on the seabed/river bed either during or after installation.

In accordance with a further aspect of the invention there is provided a largely prefabricated base for one or more turbine rotors that may be driven by passing tidal or marine currents and which are mounted on a structure that is embedded in or otherwise mounted to said base.

Preferably the one or more turbine rotors are mounted in such a manner that they can each drive a generator or generators, pumps, compressors or other means of applying the turbine shaft power they can extract from passing water current for some useful purpose, and in which provision may be made to transmit electricity, compressed air or pressurised fluid through cables or appropriate pipes to the shore or some other location where the transmitted energy may be usefully applied.

In a preferred arrangement the aforementioned turbine rotor (or rotors) and its (their) associated power train(s) can in certain embodiments of this invention be raised up the structure that holds them in place, to project above sea level such that they are more readily accessible from above the surface to facilitate maintenance and repair operations.

In accordance with the proposals of the present invention the foundation for the support structure of the turbine or turbines simply rests on the seabed and is sufficiently massive to carry the mono-pile support structure and remain stable due to its weight (that is to say a gravity structure).

A further aspect of the invention involves the use of a base of the present invention in conjunction with a turbine assembly that is mounted to a supporting structure such as a mono-pile or pylon like construction by way of a pivotal connection which enables the turbine to be positioned at an operational position below water level, or positioned at other settings such as at water level, above water level or near the water level for purposes such as maintenance.

A further aspect of the present invention is the provision of arrangements for resisting/offsetting the effects of water flow scour in relation to a base structure or other body at least partially immersed in or otherwise resting upon a seabed/river bed.

A further aspect of the invention relates to a flowing-water driveable turbine system, wherein a turbine assembly, or more generally a plurality of turbine assemblies (which may be of any viable type capable of converting the kinetic energy of the passing currents into usable power), is mounted for operational co-operation with a flow of water on a structure located in the water column in such a manner that the turbine assembly(s) is/are deployed laterally (i.e. normal to the direction of flow) across the current and the associated structure is supported by a prefabricated support base of a size and mass sufficient for it to withstand overturning moments caused by the drag of the turbine assembly(s), the support structure(s) and the support base itself, presented to the flow of water.

Preferably, the support base structure may be pre-assembled with a support structure tower, which may generally be of a mono-pile form but which may comprise other elongate vertical structure formation, and in which said pre-assembled base and its support structure tower may be carried to its intended installation site by an installation vessel having a facility for lowering the entire assembly in a controlled manner to rest at a desired position on the sea or river bed.

In a preferred arrangement prefabricated support base structure takes the form of a hollow shell or vessel which can be floated into position (with or without the aforementioned elongate vertical support structure already in place) and then be made to sink (preferably by flooding the interior) to the river or sea river bed in a controlled manner to rest in a desired installation position.

Conveniently, after such positioning the interior void of the hollow shell or vessel can be filled with ballast such as rocks to increase its stability.

Conveniently buoyancy tanks or floatation bags or other supporting devices may be used to control the rate of descent and the orientation and attitude of the hollow shell or vessel during the process of sinking it to the river or sea bed. Moreover said floatation or buoyancy devices may be controlled from a surface vessel by pumping air into the shell or vessel to increase buoyancy or releasing air from the shell of vessel to decrease buoyancy. Furthermore cables, chains or ropes may also be used to control the rate of descent and the orientation and attitude of the hollow shell or vessel during the process of sinking it either in addition to as an alternative to the aforementioned use of buoyancy tanks or floatation bags.

If desired, where any buoyancy tanks, floatation bags, chains, cables or ropes have been used they may be detached from the hollow shell or vessel once it is in the desired position on the river or sea bed.

In a particular construction the underside of the base of the hollow shell or vessel to be used as a base structure for a turbine or turbines is prepared with expandable members surrounding its periphery such that said members may be selectively extended to position the hollow shell or vessel so as to be more nearly horizontal than it may otherwise be when in contact with the uneven surface of the sea or river bed. Said expandable members may be inflatable elastomeric tubes or bags expandable by pumping a gaseous or a liquid fluid such as air or sea water into them in a controlled manner, or they may be hydraulic or pneumatic rams, or even mechanical screw-jacks extended in a controlled manner sufficiently to create the desired positioning of the hollow shell or vessel. The members may also comprise grout bags capable of inflation which will then set into the desired position.

In a further arrangement the hollow shell or vessel to be used as a foundation may have grout or other such filler material (whether of a kind that may set solid or which may just be a loose filler) injected into all the voids between its lower surface and the river or sea bed. Injection of this material may be through pipes connected to a surface vessel or through the structure i.e., mono-pile that will carry the turbine (s) or it may be assembled into the hollow shell or vessel in a form such as grout-bags which may be activated to inflate and then set once the hollow shell or vessel is correctly positioned. In a further arrangement rock anchors, pins or other such elongate fasteners may be driven in a controlled manner from the hollow shell or vessel downwards to penetrate the river or sea bed and thereby prevent any possible lateral movement or sliding of the hollow shell base structure relative to the river or sea bed. Said rock anchors, pins or other such elongate fasteners may either be driven into the sea or river bed after the base structure is positioned or they may be pre-assembled to the base of the hollow shell or vessel and forced to penetrate the sea or river bed under the influence of the weight of the hollow shell or vessel, especially if and when this is ballasted with rock or other filling material.

In a further arrangement the prefabricated base such as that formed by the hollow shell or vessel may be elongated vertically for use in deeper water to support a structure carrying an associated water current turbine or turbines) at a higher level in the water column than is strictly necessary purely from the point of view of structural stability.

In a further possible construction the base carries a jacketed structure consisting of two or more legs supporting a socket to carry a water current turbine or turbines at a higher level in the water column than is strictly necessary purely from the point of view of structural stability.

With the aforesaid construction, the legs and/or the raised socket of a jacketed base structure may be of a streamlined profile to reduce their drag in the water current.

BRIEF DESCRIPTION OF THE DRAWINGS

For a better understanding of the invention and to show how to carry the same into effect reference will now be made to the accompanying drawings in which:

FIG. 1a to FIG. 1d schematically illustrate elevations of a known tidal stream turbine installation in which FIGS. 1a and 1b illustrate side and front elevations respectively of a twin turbine arrangement mounted from a single mono-pile and when the turbines are submerged, and in which FIGS. 1c and 1d respectively illustrate the turbines when raised above sea level;

FIG. 2a to FIG. 2d schematically illustrate elevations of a known tidal stream turbine installation in which FIGS. 2a and 2b illustrate a multi-turbine arrangement mounted by way of spaced apart mono-piles in side and front elevation respectively and when the turbines are submerged, and in which FIGS. 2c and 2d respectively illustrate the turbines when raised above sea level;

FIG. 4b illustrates schematically an intermediate stage in the handling process indicated by FIG. 4a;

DETAILED DESCRIPTION OF THE DRAWINGS

Figures 2A, 2C:
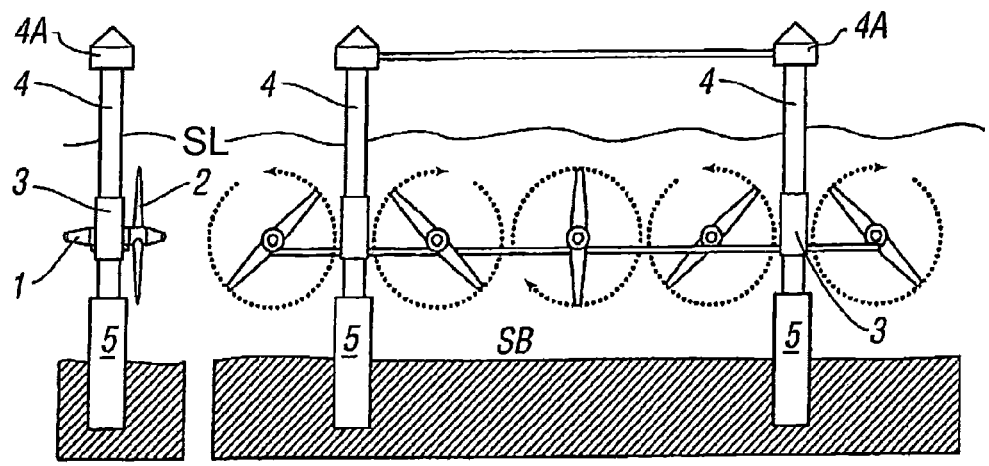
Figures 2B, 2D:
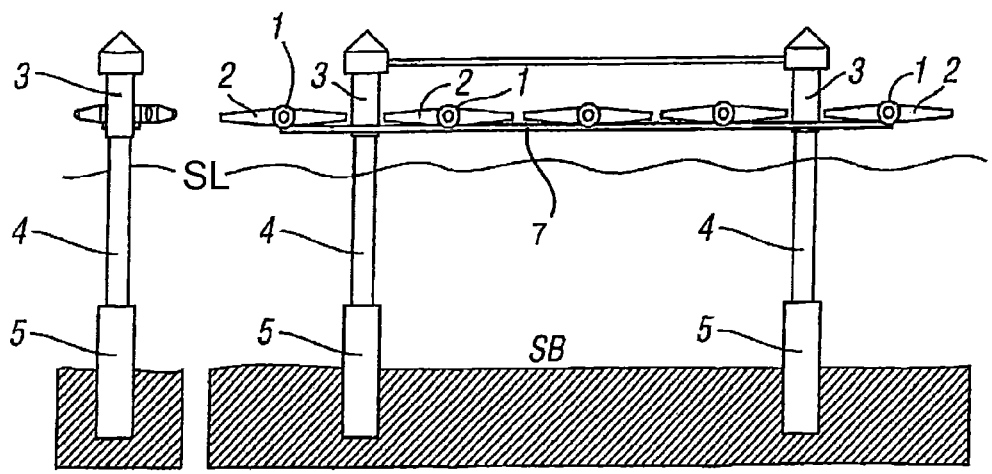

FIGS. 1a to 1d illustrate the mounting of a pair of turbines 1 and associated rotors 2 by way of an axially displaceable sleeve 3 from a single mono-pile structure 4 in a river or sea bed SB by way of a support 5 embedded in the river or sea bed SB such that the turbines 1 are separately capable of extracting energy from passing currents. In the preferred embodiment shown the rotors 2 are mounted either side of a mono-pile structure 4. It should be noted that the preference with the prior art was for the said mono-pile structure to be embedded in a socket drilled in the seabed/river bed SB such that the turbine rotor or rotors 2 are aligned normal to the direction of flow of the current. Hence the view given in the FIGS. 1a and 1b would involve the flow of water being perpendicular to the paper on which the figure is viewed. Since most tidal flows are bi-directional (ebb and flood tides) the turbine rotors 2 may address the flow from either direction by using pitch control as disclosed in our earlier British Patent No 2347976 "Variable Pitch Turbine" and its foreign derivatives, or other means such as yawing the rotors about either a horizontal or a vertical axis may be used.

It will be noted that the upper part of the mono-pile projects above sea level SL and is provided with a housing 4A for locating/receiving, for example control equipment (not shown).

The FIGS. 1c and 1d show how said turbine rotor(s) (with their accompanying power trains (not shown) which latter will most generally include a speed-increasing gearbox and generator) can be raised up the mono-pile support structure 4/5 until they are positioned above the surface SL of the sea/water.

FIGS. 2a to 2d show how, as compared with the disclosure of FIGS. 1a to 1d, a single rotor 2 or a plurality of rotors 2 may be supported from more than one mono-pile 4 (e.g., two (or more) monopiles bridged by a cross arm (or arms) 7 carrying a plurality of rotors is a possible embodiment).

Figures 3A, 3B:
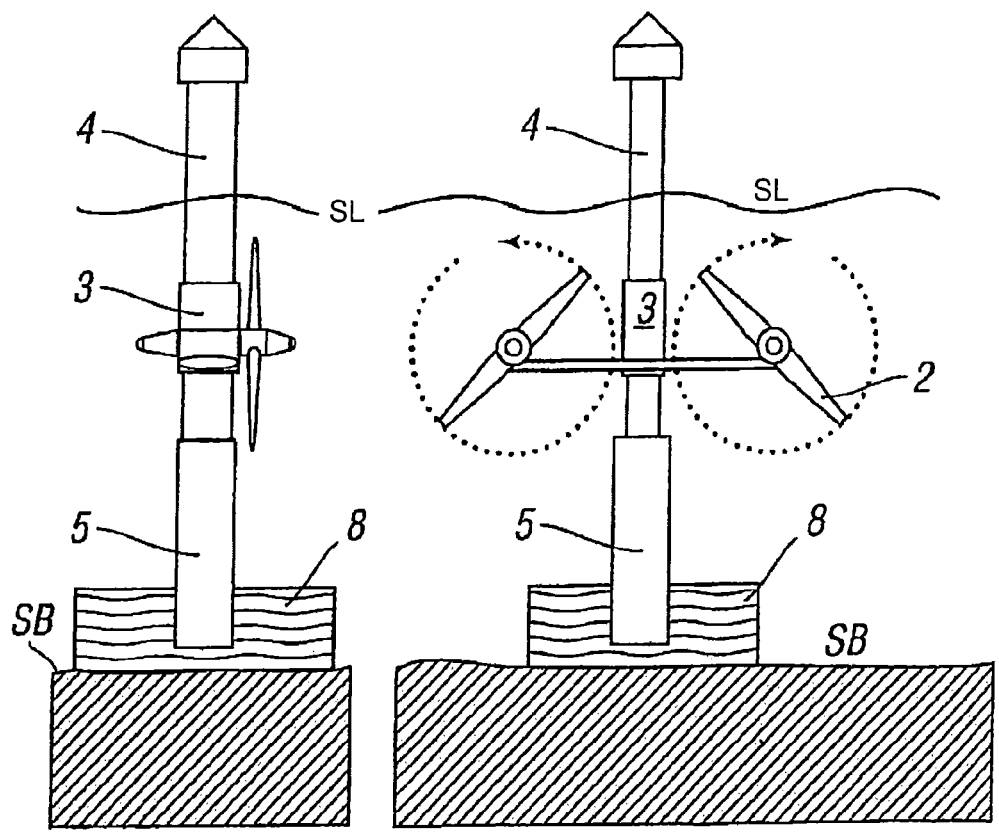
FIGS. 3a and 3b respectively very schematically illustrate side and front elevations of an embodiment of the invention.

FIGS. 3a and 3b schematically illustrate arrangements similar to that of FIGS. 1a to 1d mounted from a mono-pile 4. In the embodiment of FIGS. 3a and 3b the mono-pile 4 is mounted by a heavy solid supporting base 8 designed such that it is sufficiently heavy and stable as to resist the maximum anticipated toppling loads at its installation position. As in FIGS. 1a to 1d the arrangement of the mono-pile 4 is of such length as to project above the surface SL of the water so as to permit the turbine or turbines mounted thereto complete with associated power trains to be raised above the surface for maintenance or repair. This latter situation is not illustrated in the FIGS. 3a and 3b.

The heavy solid supporting base structure 8 may be pre-fabricated on-shore so that installation of the base structure 8 in its basic and simplest form consists of simply lowering the complete base structure 8, with or without the mono-pile/pile (s) 4 already set in place, to the river or sea bed SB.

Whilst the FIGS. 3a and 3b illustrate the use of a single mono-pile 4 it will be understood that the base structure 8 can be dimensioned so as to provide for the support of two or even more monopiles or other forms of means for mounting the turbines from the base structure 8.

Figure 4A:
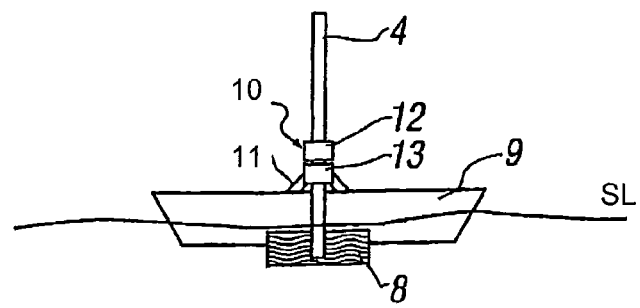
FIG. 4a schematically illustrates a first stage involved with a method of handling for installation purposes a turbine support structure including a base structure of the invention.
Figure 4B:
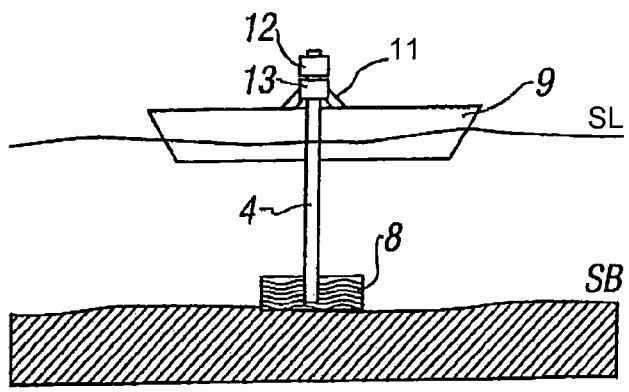
Figure 4C:
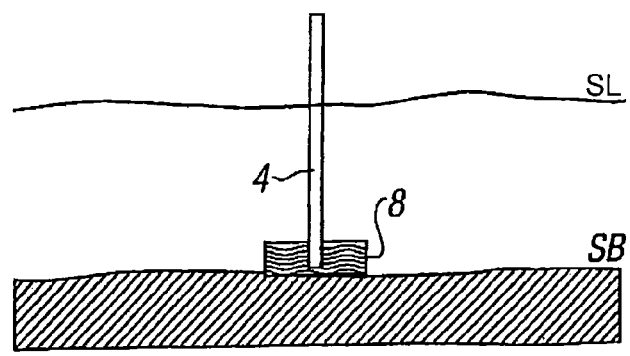
FIG. 4c illustrates schematically a turbine support structure of FIG. 4a following its positioning upon a seabed/river bed.

FIGS. 4a, 4b and 4c show a possible procedure for installing a preassembled mono-pile 4 mounted on a heavy base structure 8.

With the proposal of these FIGS. 4a to 4c the basic principle is to use preferably a twin hulled barge or a wide barge 9 with what is called a "moon pool" (not separately shown) to transport said pre-assembled base structure 8 (together with the required number of mono piles 4). In the FIGS. 4a and 4b the barge 9 is shown in longitudinal section.

The pre-assembled base structure 8 and associated mono-pile(s) 4 is conveniently held with respect to the barge 9 by a schematically represented gripper arrangement 10 mounted by supports 11 on a bridge (not shown) spanning between the two hulls of the barge 9 or across the aforementioned "moon pool" in much the same way that the legs of jack-up barges are secured.

The arrangement includes two separately controllable friction grip units 12, 13 for each mono-pile 4 involved, the gripper units 12, 13 being of such construction that they can be activated to close/grip around all or part of the circumference of the associated mono-pile 4 with sufficient applied force that the friction created is more than sufficient to support the weight of the mono-pile 4 and the weight of the base structure 8. Said grippers units 12, 13 may be activated using pneumatic or hydraulic pressurised rams which are not illustrated. The two sets 12, 13 of grippers are disposed one above the other such that one can be moved axially (in the vertical direction) relative to the other using hydraulic rams, jacks or other suitable devices. It will be understood that the gripper units 12, 13 are mounted to the barge 9 in such fashion as to permit a controlled vertical displacement of the mono-pile 4 and the base structure 8 relative to the barge 9.

With this controlled vertical relative positioning of gripper units 12, 13 it is possible to raise or lower the mono-pile 4 by alternately relaxing one gripper unit, moving the other gripper unit and the mono-pile relative to the relaxed gripper unit, resetting the relaxed gripper to its gripping setting, and repeating the operation.

This possibility leads to various possible sequences of operation of the units 12, 13 to displace the assembly of the base structure 8 and the mono-pile 4 relative to the barge 9.

In one such possible sequence of operation the assembly of the mono-pile 4 and the base structure 8 is allowed simply to drop by releasing both gripper units. If desired the rate of drop may be controlled by maintaining a partial gripping action on the mono-pile sufficient to slow/steady the fall of the assembly.

A second possible sequence of operation enables the assembly of the base 8 and the mono-pile 4 readily to be progressively lowered or raised relative to the seabed, as follows. It will be presumed that the assembly is being supported by the two gripper units 12, 13, following setting the gripper units 12, 13 to their clamping positions. To commence a lowering operation from the position shown in FIG. 4a the upper clamp unit 12 is released and is initially moved upwardly of the monopile 4 and is reset to its clamping position. The second gripper unit (the lower one) 13 is released from its gripping position and the upper gripper unit 12 is lowered in a controlled manner relative to the barge to its lower position thereby moving the monopile 4 downwards by the length of the stroke of the movement of the upper gripper unit 12, at which point the lower gripper unit 13 is closed to hold the pile 4 and the process is repeated until the base structure 8 is resting upon the river or seabed SB.

As a further possibility the upper gripper unit(s) 12 is/are released and then the bottom gripper units 13(s) is/are moved together in such a manner as to "step" the mono-pile 4 vertically, either upwards or downwards.

The three FIGS. 4a, 4b and 4c illustrate one sequence for lowering a mono-pile 4 on a base 8 onto the river or seabed SB.

In practice, however, the requirements for this to be a practical structure in a fast moving current of either the sea or a river are more complicated than so far as above suggested since in practice some two operational problems remain to be overcome:

The first of these is that the surface of the seabed SB will invariably be uneven so that simply lowering a base structure 8 onto the river seabed SB is unlikely to result in it lying completely level and as a result the support mono-pile 4 may finish significantly tilted from the preferable vertical position that is desired. Moreover, the base 8 may even fail to make secure contact with the seabed ground and thus be free to rock or move under the influence of the large forces caused by the water current flows in such a location.

Furthermore the placing of a solid base structure 8 on the bed of a fast moving water column may/will tend to cause a phenomenon known as scour, in which the presence of an obstruction in a water flow causes the water flow to accelerate and this will cause material around the base structure 8 to be eroded, eventually as a result causing a scour pit to be excavated which can undermine and even topple the base structure.

It is thus a further important aspect of the present invention to provide arrangements for resisting/offsetting the effects of water flow scour in relation to a base immersed in/resting upon a river or sea bed SB.

Figure 5A:
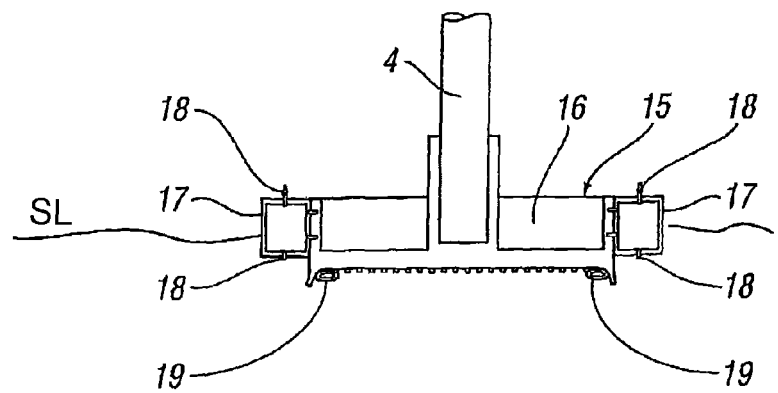
FIG. 5a, schematically illustrates an embodiment of a hollow construction of a base incorporating arrangements for offsetting the development of scour and for accommodating positioning upon an uneven seabed/water bed, the Figure illustrating the construction when at water level.
Figure 5B:
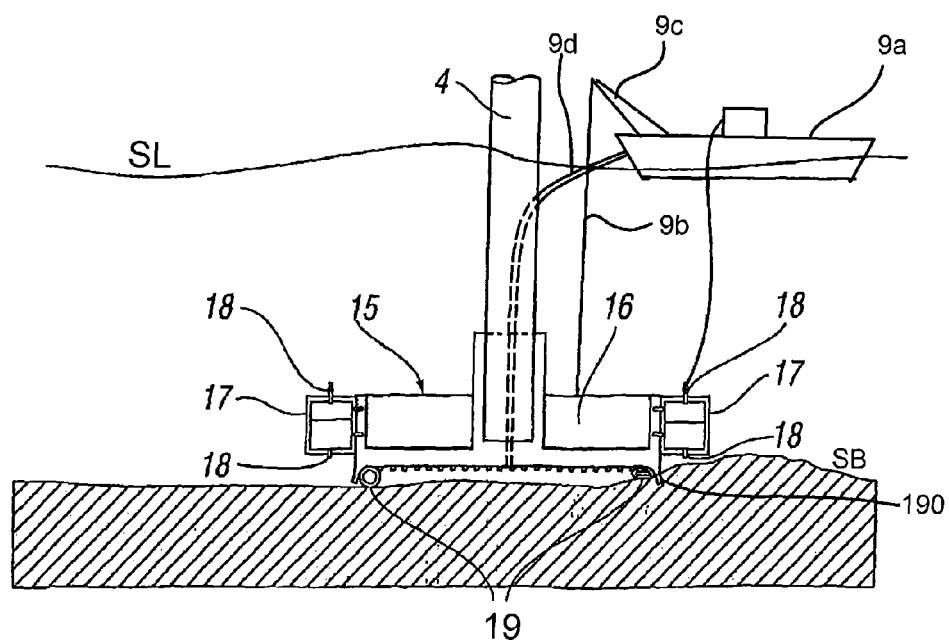
FIG. 5b schematically illustrates the construction of FIG. 5a when it has been initially lowered to the seabed/river bed.
Figure 5C:
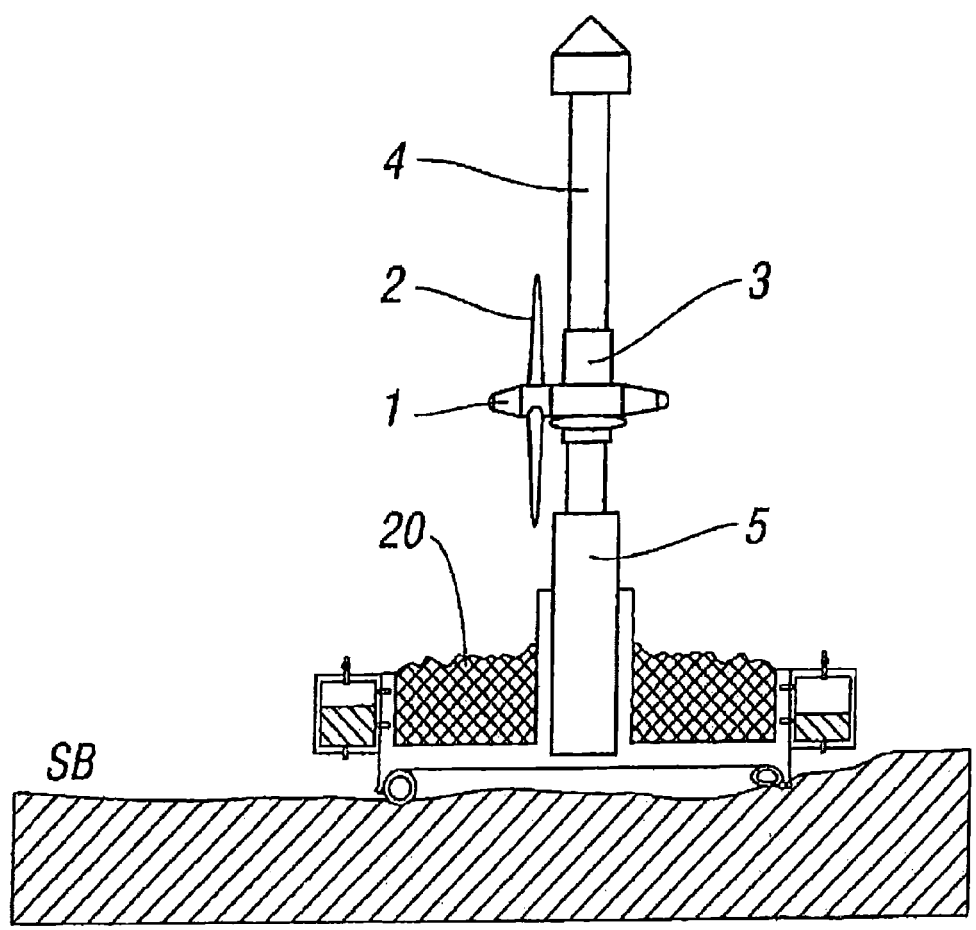
FIG. 5c schematically illustrates the construction of FIGS. 5a and 5b after the construction has been positionally set and loaded into its operational position.

Referring now to FIGS. 5a, 5b and 5c which disclose an embodiment of a base structure 8 incorporating several features which are primarily concerned with overcoming both the problems of positioning and leveling a turbine(s) support structure (i.e., mono-pile(s) 4 mounted on a solid base structure and also of avoiding/reducing problems due to scour).

FIG. 5a schematically illustrates in schematic terms a first embodiment of a base structure 8 in which the base may be constructed as a barge-like hollow shell 16 such that it can float with or without the support in place (in some cases the mono-pile 4 may be installed after the base is positioned on the bed SB of the sea or river since the base structure may not float well with it in place as illustrated). The hollow shell 16 of the base structure 8 carries air-filled containers 17 around its periphery. Said containers 17 may be solid flotation tanks as illustrated or they may be flexible and removable floatation bags. They can add buoyancy and stability to the shell 16 while it is being floated into place.

The containers 17 have upper and lower valves 18 which can be opened so that air is released and water enters the containers 17 from below, thereby reducing the buoyancy. The valves 18 in most cases will be connected with hoses or pipes to a servicing vessel 9a (not shown to scale) and in fact air may then be added (using a compressor or cylinders of compressed air shown schematically on the vessel 9a) or released by personnel (or by an automated system) on board the servicing vessel 9a. In this way both the buoyancy and the attitude of the hollow-shell 16 of the base structure 8 can be regulated and controlled.

The weights and buoyancy are designed such that if the hollow shell 16 is flooded, the containers 17 are just sufficiently buoyant to keep the whole assembly afloat. Then releasing even a small amount of air in a controlled manner can allow the assembly to sink slowly to the river or seabed SB, with its attitude being controlled by releasing or adding air differentially from whichever side is too high or too low respectively. Tension members in the form of cables 9b paid out by winches 9c on the servicing vessel 9a can be used either to supplement the effect of the containers 17 as means for ensuring a controlled descent through the water column or instead of the containers 17.

It needs to be stressed that the deployment of such a system in areas with fast moving currents needs to be carried out at slack tide as rapidly as possible. In areas with continuous currents, such as rivers, the task will be carried out when the current is as low as possible and fixed cables attached to anchors and vessels will be used to ensure the positioning is not disrupted by the drag forces caused by the current.

FIG. 5b shows the hollow foundation shell 16 resting on the river or seabed SB. It is likely the bed SB will not be level, even if a relatively level area of river or sea bed SB is selected. Therefore provision is made to inflate expandable members 19 differentially to compensate for unevenness of the seabed.

If pneumatically inflated supports are used it is of course necessary first to remove the remaining air from the containers 17 (or to remove the containers completely) to prevent the members 19 from raising the buoyancy sufficiently to destabilise the shell 16. The preferred solution is to use inflatable elastomeric bags (as expandable members 19) arranged around the periphery of the underside of the shell 16. An umbilical 9d (shown schematically in FIG. 5b) connected to the servicing vessel 9a, possibly but not necessarily, through the mono-pile 4, has individual hoses to each bag which can then be differentially inflated to obtain a level position for the base structure 8. Hydraulic jacks, inflatable grout bags or other known techniques may also be applied for this purpose. Located immediately to the outside of the members 19 is an elongate fastener 190 driven downwards to penetrate the sea or river bed SB, and thereby assist in preventing lateral movement or sliding of the base 8 relative to the sea or river bed SB.

FIG. 5c shows how the shell 16 may be filled with ballast 20, in most cases rock, and then concrete grout or other such filler material may then be injected into the void below the shell 16 to fill in any voids between the shell and the sea or river bed SB. Probably only some of the ballast rock 20 will be in-filled to the shell in order to ensure stability before the grout is injected. Conventional grout bags may also be provided as an alternative means for leveling and filling voids between the shell 16 and the sea or river bed SB. It may also be necessary to remove loose material from the sea or river bed SB prior to positioning the base structure 8. This removal may be achieved by dredging, use of high pressure hoses, or other means.

Once the hollow shell foundation 16 has been correctly positioned, stabilised and ballasted with rock, the mono-pile structure 4 may be lowered into its socket and grouted into place (if it was not already pre-installed). Following this, the remaining structural components and the turbine rotors (or rotor) 2 and power trains (or train) are installed on the structure from surface vessels or from a jack-up barge.

It should be stressed that the aforementioned methods illustrated and described in relation to said first embodiment for leveling and grouting the hollow shell foundation have been presented essentially to explain a possible method for base installation. It will be appreciated that other constructions, methods, and techniques may be used for positioning, leveling and stabilising a concrete foundation of the kind proposed in fast-moving water.

Figure 6:
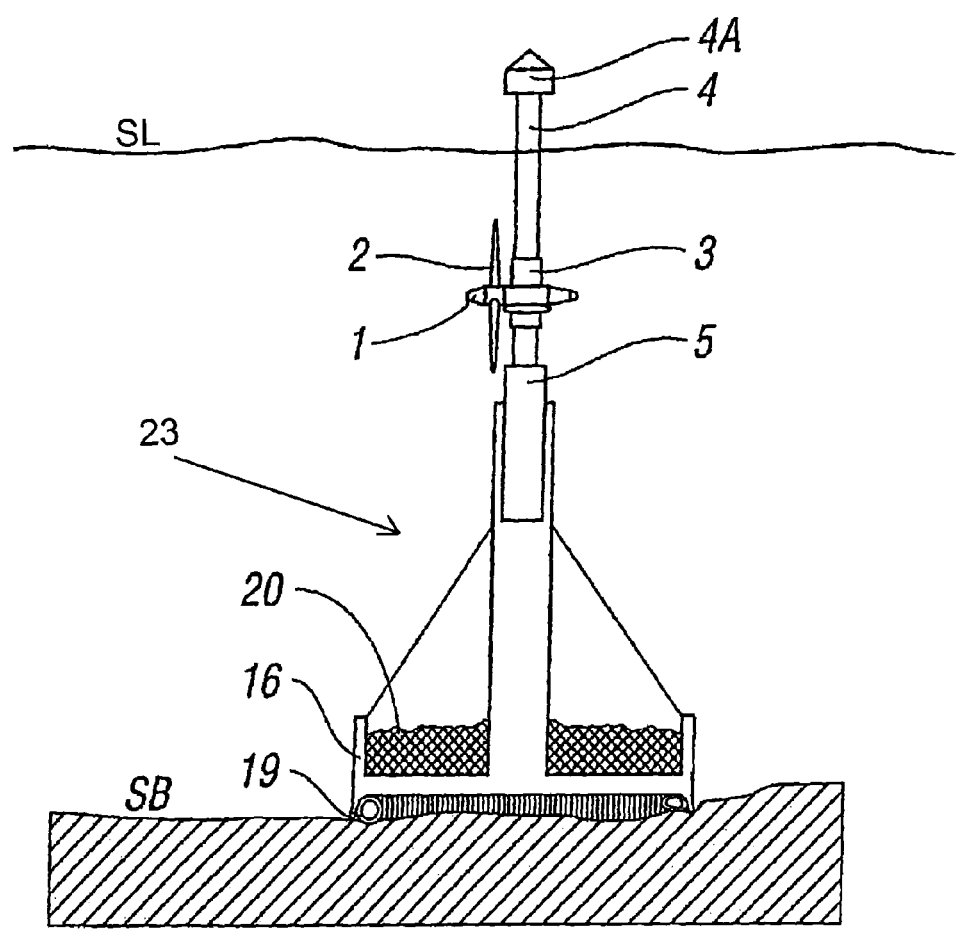
FIG. 6 schematically illustrates how a hollow shell structure used for the base may be elongated vertically and carrying a turbine or turbines may be raised when deployed in deeper water.

Referring now to FIG. 6, as mentioned, this illustrates how the shell structure 16 used for the base 8 may be elongated vertically forming an upstanding structure 23 so that the support structure 5 for the mono-pile 4 carrying a turbine or turbines 1 may be raised when deployed in deeper water. The advantages of this arrangement are that, firstly the mono-pile support structure 5 can be shorter than it would otherwise have to be which could save cost since the base structure may be made from less costly materials than the mono-pile 4, secondly the turbine(s) 1 is/are positioned high in the water column where the currents will be strongest and they will capture more energy and thirdly the top 4A of the structure remains above the level of the water SL which makes it visible to shipping and permits the turbine(s) 1 and power train(s) to be raised above the surface as disclosed in our aforementioned earlier patents.

Figure 7:
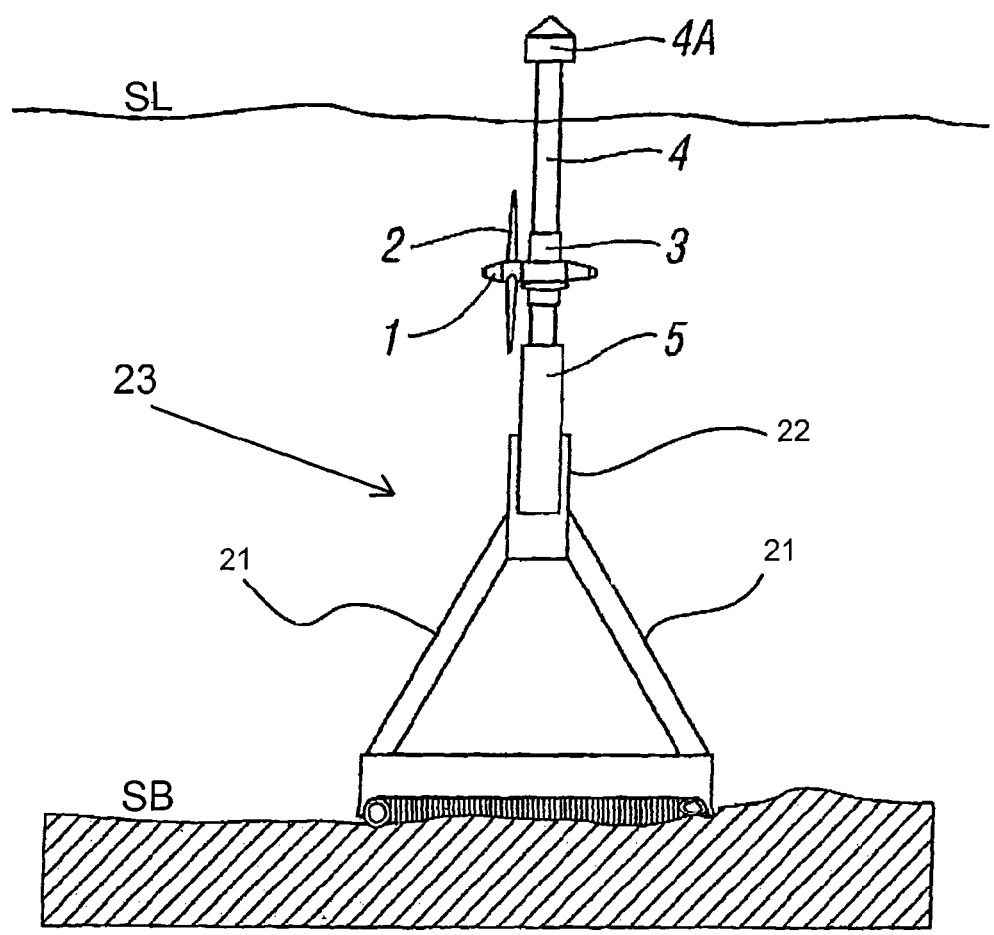
FIG. 7 schematically illustrates a variation of the construction of FIG. 6 in which the foundation is raised in the form of what is known in the realm of sub-sea technology as a "jacket" rather than a solid structure.

FIG. 7 is a refinement of the structure shown in FIG. 6 in which the foundation is raised in the form of what is known in the realm of sub-sea technology as a 'jacket" rather than a solid structure. Here legs 21 support a socket 22 which holds the mono-pile support structure 4/5 in a raised position relative to the river or sea bed SB. Two, three or more legs 21 may be used for support as indicated. Moreover this upstanding structure 23 may preferably (but not necessarily) be prefabricated in reinforced concrete and the legs 21 may have a streamlined profile to minimise the drag forces they will cause. The socket 22 may also have a streamlined profile (not shown) for the same reason. The structure of FIG. 7 may be regarded as being more advantageous than that of FIG. 6 because it uses less material and involves a lesser drag factor from the water currents. The base structure 8 may be shaped to extend below the rotors of a twin rotor tidal turbine installation (and could be extended further where a system with a larger number of turbines and associated rotors are used) such that it may improve the water flow through the lower part of the rotor (s) by providing a smooth convex surface.

The point that is that the base structure 16 may carry side extensions specially shaped to modify the flow of water relative to the installation with a view to reducing turbulence caused by the boundary layer conditions near the river or seabed bed SB, to reducing velocity shear effects and, subject to local physical conditions in relation to the formation of the base shape and profile, lead to acceleration of relative water flow and to enhance the level of energy capture for a given size of rotor.

The invention claimed is:

1. A method for mounting at least one tidal turbine and an associated support structure in a river or sea bed, comprising:
    mounting the at least one tidal turbine to a support structure and mounting the support structure upon a base, the base being of such weight as to involve gravitational forces of such magnitude as to be sufficient to withstand forces acting in such manner as to tend to displace the at least one turbine and the associated support structure, the base having an underside with a periphery,
    providing the periphery of the underside of the base with expandable members, the expandable members being selectively expanded to position the base more nearly horizontal when in contact with a sea or river bed, and
    filling the expandable members selectively with a filler material, whereby filling of the expandable members serves to position the support structure in a substantially level position.

2. The method as claimed in claim 1, and further comprising:
    forming the base as a hollow shell enabling the base to be floated into position, and,
    when the base is in a desired position, sinking the base to the sea or rived bed in a controlled manner.

3. The method as claimed in claim 2, wherein the sinking of the base comprises filling the base hollow shell with water in a controlled manner.

4. The method as claimed in claim 2, wherein the sinking of the base comprises filing the base hollow shell with ballast to increase the weight and stability of the base.

5. The method as claimed in claim 4, and further comprising:
    delivering a filler material from a surface vessel to the base on the sea or river bed.

6. The method as claimed in claim 2, and further comprising:
    providing the base with buoyancy devices for enabling control of the rate of descent, orientation and attitude of the base during the process of sinking the base to the sea or river bed.

7. The method as claimed in claim 6, and further comprising:
    controlling the buoyancy of the buoyancy devices from a surface vessel by pumping air into the devices to increase the buoyancy or releasing air from the base to decrease the buoyancy.

8. The method as claimed in claim 2, and further comprising:
providing elongated flexible tension members for controlling the rate of descent, orientation and attitude of the base during the process of sinking the base.

9. The method as claimed in claim 8, and further comprising:
detaching the elongated flexible tension members from the base once the base is in a desired position on the sea or river bed.

10. The method as claimed in claim 1, and further comprising:
providing elongate fasteners that are driven downwards to penetrate the sea or river bed and thereby assist in preventing lateral movement or sliding of the base relative to the sea or river bed.

11. The method as claimed in claim 10, and further comprising:
pre-assembling the elongate fasteners to the base to be positioned to penetrate the sea or river bed under the influence of the weight of the base when the base is filled with ballast or other filling material.

12. The method as claimed in claim 1, and further comprising:
providing a vertically elongated base adapted to receive the support structure at a higher level than is strictly necessary purely from the point of view of structural stability.

13. The method as claimed in claim 12, and further comprising:
forming the upstanding structure of a jacketed construction including at least two legs supporting a socket wherein the legs and the raised socket are of a streamlined profile to reduce drag in the water current.

14. The method according to claim 1, wherein the expandable members are elastomeric bags.

15. The method according to claim 14, and further comprising; connecting an umbilical to each of the elastomeric bags.

16. The method according to claim 15, and further comprising: differentially expanding each bag to positionally level the base.

17. A base structure adapted to rest upon a sea or river bed so as in use to support at least one tidal turbine installation and a support structure associated with the at least one tidal turbine, the base structure comprising:
means for mounting the at least one tidal turbine installation and support structure to the base structure; and
one or more expandable members operatively locatable between an underside of the base structure and the sea or river bed, the one or more expandable members being adapted to be selectively filled with a filler material, whereby filling of the expandable members serves to position the base structure in a substantially level position despite uneven surface on the sea or river bed.

18. An arrangement for mounting at a location of a sea or river bed at least one tidal turbine installation and an associated installation support structure upstanding from a base structure that is intended to rest upon the sea or river bed to provide a combination to resist maximum anticipated toppling loads at the location, comprising:
means for suspending the installation support structure and the base structure from at least one installation vessel during the transportation thereof to the location for installing the installation support structure, wherein said means for suspending includes
means for enabling controlled lowering of the installation support structure and the base structure to the sea or river bed whilst support of the installation support structure and the base structure is maintained throughout said lowering and
expandable members operable for the purpose of levelling the base structure when on the sea or river bed, wherein the expandable members are operatively locatable between an underside of the base structure and the sea or river bed, the expandable members being adapted to be selectively filled with a filler material, whereby filling of the expandable members server to position the base structure in a substantially level position.

* * * * *